United States Patent [19]

Carrick et al.

[11] 4,227,255
[45] Oct. 7, 1980

[54] SIGNAL CLASSIFIER

[75] Inventors: Robert L. Carrick, Vienna; William T. Manning, Centreville; Robert E. Grimes, Leesburg, all of Va.

[73] Assignee: Telcom, Inc., Vienna, Va.

[21] Appl. No.: 29,059

[22] Filed: Apr. 11, 1979

[51] Int. Cl.² .............................................. H04B 17/00
[52] U.S. Cl. ...................................... 455/226; 455/67; 328/140; 307/233 R
[58] Field of Search ............... 325/103, 133, 134, 315, 325/316, 363, 329, 336, 337, 347, 349, 67, 45, 47, 49, 50, 137; 328/137, 139, 140, 141; 329/111, 135, 136, 178; 307/233 R; 324/77 R, 78 J, 118, 131

[56] References Cited

U.S. PATENT DOCUMENTS

| | | | |
|---|---|---|---|
| 3,199,030 | 8/1965 | Oxford et al. | 325/329 |
| 3,546,585 | 12/1970 | Leibowitz et al. | 328/141 |
| 3,581,220 | 5/1971 | Bell et al. | 328/140 |
| 3,588,701 | 6/1971 | Kahn | 325/103 |
| 3,622,877 | 11/1971 | MacDavid et al. | 325/67 |
| 3,688,197 | 8/1972 | Kahn | 325/329 |
| 3,992,670 | 11/1976 | Gittins et al. | 325/363 |

Primary Examiner—Benedict V. Safourek
Assistant Examiner—Tommy P. Chin
Attorney, Agent, or Firm—Ira C. Edell

[57] ABSTRACT

A signal classifier performs measurements on an IF signal and determines from these measurements the nature of the modulation, if any, appearing on a received high frequency communications signal. The classifier distinguishes between double sideband AM, single sideband suppressed carrier voice AM, ASK, FSK, multi-channel FSK, unmodulated carrier and noise. The measurements include AM variation, the zero crossing rate in detected AM, the percentage of time the detected AM signal level exceeds a given amplitude, and wide and narrow band detected FM.

27 Claims, 4 Drawing Figures

SIGNAL CLASSIFIER

TECHNICAL FIELD

The present invention relates to automatic classification of communication signals. More specifically, the present invention relates to high speed determination of the nature of any modulation appearing on a high frequency signal received at any receiving equipment.

BACKGROUND ART

Automatic classification of communication signals has not been achieved in any practical sense prior to the present invention. This is so in spite of the fact that there is a definite need for such equipment on the part of many users, such as government agencies, to monitor portions of the communication spectrum. The general problem of automatic signal classification seems at first to be a rather simple task. Most radio operators can learn in rather short order to recognize and classify specific signals with the aid of time representations, spectral displays, audio characteristics, and the like. However, the translation from those classifying operations performed mentally to a set of specific instructions to be performed by a machine is a difficult problem indeed. This is a problem of long-standing interest that has eluded a systematic approach to solution. Although there have been numerous investigations concerning pattern recognition techniques, most of these are directed at specific problems, which have limited extension to other problems, or to those utilizing complex adaptive techniques, which are rather difficult to analyze theoretically. As a result, there does not yet exist a general unifying concept, or basic method of approach to problems in the field of automatic pattern recognition.

Automatic signal classification is thus not a singular problem, but rather is a composite consideration of the following broad categories: Establishing a desirable model to fit the specific problem statement; Specification of a set of measurements to be performed on the electrical signals; and Characterization of the recognition techniques that exploit the differences in the measurement values.

It is therefore an object of the present invention to provide a method and apparatus for automatically classifying communication signals received at a receiver.

In providing signal classifier equipment that is capable of operating in conjunction with a wide variety of receiver it is necessary to render the equipment adaptable to accommodate different intermediate frequencies as well as variations in amplitude and phase of the incoming signal.

It is another object of the present invention to provide an interface technique for adapting the signal classifier to substantially any communication receiver.

DESCRIPTION OF THE INVENTION

In accordance with the present invention, several basic measurements are performed on a detected IF signal from a receiver. On the basis of the results of these measurements and their relationship to pre-established threshold values, determinations are automatically made which characterize the nature of the modulation appearing on the received signal. The basic measurements selected are (1) Activity Factor, which is a measure of the percentage of time that the input signal envelope resides above a predetermined amplitude threshold; (2) AM Variation, which is a measure of amplitude modulation level variations; (3) AM Zero Crossing Rate, which is a measure of the frequency of zero level crossings occurring in the detected amplitude modulation; and (4) FM Variation, which measures phase angle variations in the detected frequency modulation.

The aforementioned measurements permit automatic recognition of the following types of received signals: unmodulated carrier; AM analog with carrier (double sideband); AM voice with suppressed carrier SSB (single sideband); amplitude shift keying (ASK); frequency shift keying (FSK); multi channel FSK (MUX); and noise only.

The Activity Factor measurement may be looked on broadly as a determination of whether or not there is a signal present. An Activity Factor measurement showing above-threshold signal near 0% of the time is an indication that there is no signal. Likewise, an Activity Factor measurement near 100% is indicative of a continuous signal. An Activity Factor measurement between these two indicates a discontinuous signal.

The AM Variation measurement serves to distinguish an un-amplitude modulated carrier and an angle modulated carrier from other signal forms.

The AM Zero Crossing measurement serves to distinguish ASK signals from AM voice signals with suppressed carrier signal sideband. More specifically, ASK ideally has a very low zero crossing rate while the latter SSB voice signal is expected to have a high rate.

Both wide and narrow band FM variation measurements are performed. These two measurements permit narrow band signals and quaternary FSK signals to be distinguished from the wider band MUX signals.

The flexible interface circuitry of the system includes multiple crystals which can be selected to permit operation with receivers operating at a variety of intermediate frequencies (IF). Automatic frequency control and automatic level control techniques are employed to assure a high degree of signal classification accuracy.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

BEST MODE OF CARRYING OUT THE INVENTION

Figure 1:
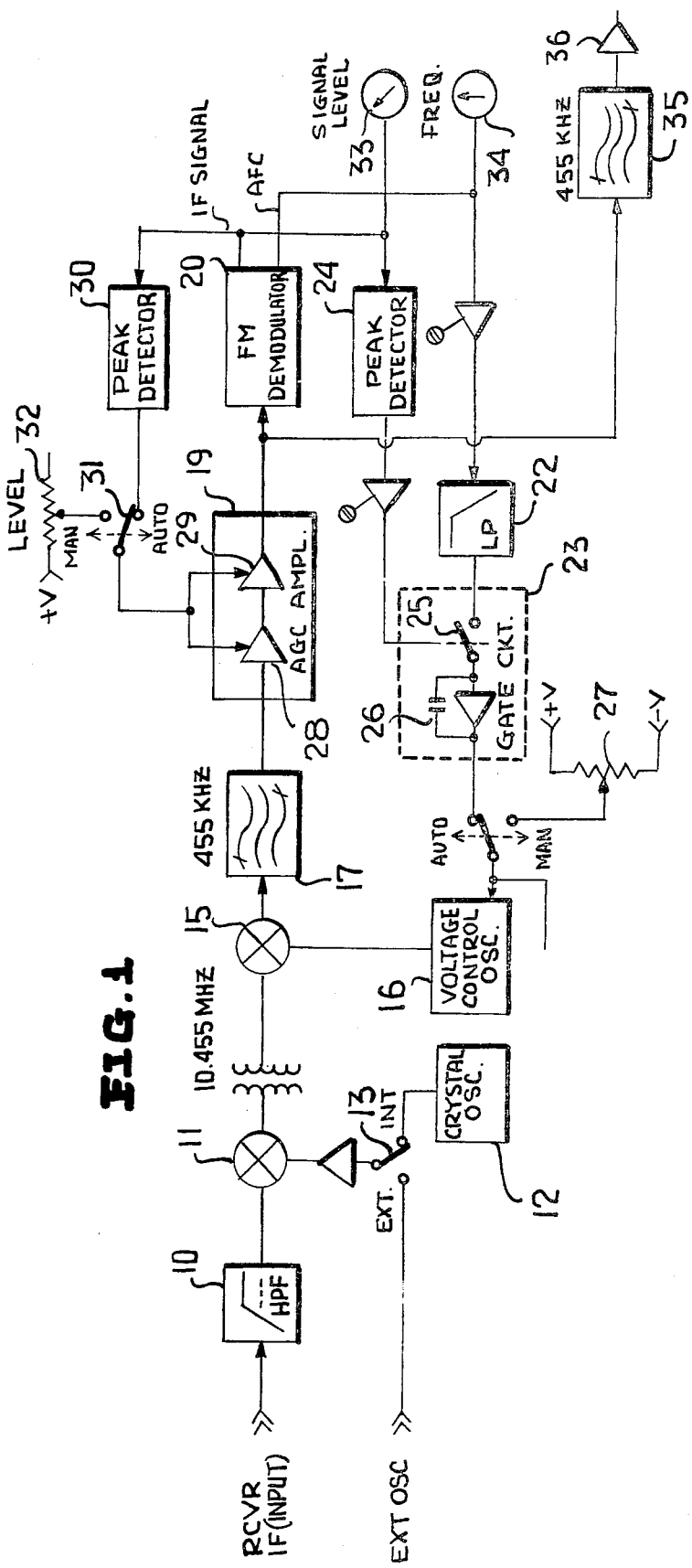
FIG. 1 is a schematic diagram of interface circuitry employed to permit the signal classifier to be used with a wide variety of receivers.

Referring more specifically to FIG. 1, the input signal to be classified (RCVR IF) is the IF signal from the receiver which receives the signal in question. In other words, the received signal is translated to IF at the receiver (not shown) before being applied to the signal classifier. This IF signal is passed through a high pass filter 10 to remove low frequency noise and then to a first mixer 11. The function of mixer 11 is to translate the incoming IF signal to a known frequency which, in the specific example, is 10.455 MHz. A plug-in crystal oscillator 12 is selected to be compatible with the incoming IF signal for purposes of providing the known frequency. In the example chosen, the incoming IF signal and the crystal oscillator differ in frequency by 10.455 MHz. Alternatively, an external oscillator may serve the function of oscillator 12 by placing switch 13 in its EXT position.

The 0.455 MHz signal, bearing all of the modulation present on the incoming IF signal, is passed through isolation transformer 14 to a second mixer 15. Mixer 15 also receives the output signal from voltage controlled oscillator (VCO) 16 which has a nominal frequency of 10 MHz. The result is a 455 KHz signal, also bearing all of the modulation appearing on the incoming IF signal, which is passed to bandpass filter 17 centered at 455 KHz with a bandwidth of approximately 17 KHz. Accuracy of the demodulation and classification of the signal is enhanced by maintaining this 455 KHz signal in the center of the passband of filter 17. VCO 16 is an accurate crystal voltage controlled oscillator which can be frequency-controlled by automatic or manual means as controlled by switch 18. When switch 18 is in the AUTO position, VCO 16 is part of a closed frequency loop. The loop includes an automatic gain control (AGC) amplifier 19 (to be described below) which receives the 455 KHz signal from filter 17 and passes it to FM demodulator 20. The function of demodulator 20 is to detect frequency variation in the 455 KHz and provide at its AFC output an error voltage to control VCO 16. This error voltage is passed through amplifier 21 and low pass filter 22 to a gate circuit 23.

The FM demodulator 20 also passes a demodulated IF signal to a peak detector 24 which controls the position of a switch 25 in gate circuit 23. In the absence of IF signal above a pre-established minimum amplitude, switch 25 is maintained open (the position shown); when the IF signal level is above that minimum amplitude, switch 25 closes and passes signal from low pass filter 22 to an integrator 26 which, in turn, feeds its output signal as a control for VCO 16 through the AUTO position of switch 18. When switch 25 is opened (due to too low an IF signal level), the control voltage applied to VCO 16 from integrator 26 is the previously applied level built-up in integrator 26. The discharge time constant of integrator 26 is on the order of a few seconds so that if the IF signal disappears for that long a period, the control voltage applied to VCO 16 decays and returns the VCO frequency to its nominal center frequency (10 MHz in the present example). VCO 16 can also operate open loop whereby its frequency is manually controlled by means of FREQ potentiometer 27 through the MAN position switch 18. In the particular example, the VCO frequency can be controlled over ±5.0 KHz in the closed loop mode and over ±2.5 KHz in the open loop mode.

A high degree of confidence in the signal classification procedure is obtained when both the amplitude and frequency of the signal are maintained within defined limits prior to classification processing. Frequency control is effected automatically as described above in the closed loop control of VCO 16 and manually by potentiometer 27. Amplitude can also be controlled, by the circuit of FIG. 1, over a 60 dB range by either manual or automatic means. This control is achieved by means of two series-connected transconductance amplifiers 28 and 29 which form part of AGC amplifier circuit 19. The demodulated IF signal output from FM demodulator 20 is peak detected at detector 30 which controls the gain of amplifiers 28 and 29 through the AUTO position of switch 31. This AGC feedback arrangement serves to keep the IF signal output level from demodulator 20 constant. Manual control of this signal is achieved by means of LEVEL potentiometer 32 acting through the MAN position of switch 31 to control the gain of amplifiers 28 and 29.

A signal level meter 33 provides an indication of relative signal strength and is connected to meter the level of the IF SIGNAL output from demodulator 20. Frequency variations are indicated on FREQ meter 34 which actually measures the level of the error signal (AFC) provided by demodulator 20.

The controlled output provided by AGC amplifier 19 is the signal which is processed for signal classification. It is passed through a narrowband 455 KHz filter 35 and amplifier 36 to the classification processing circuitry illustrated in FIG. 2.

Figure 2:
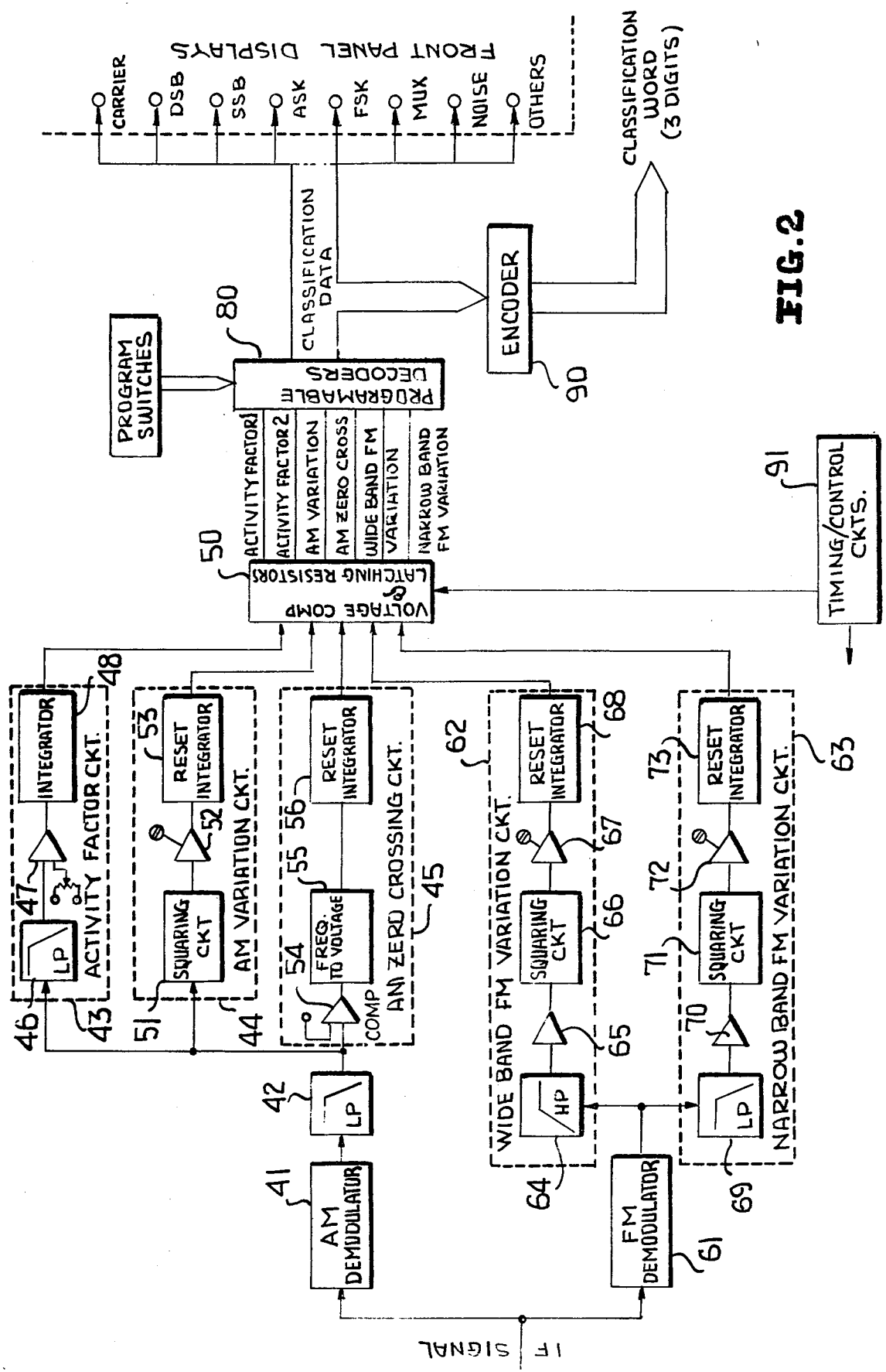
FIG. 2 is a schematic diagram of a signal classifier according to the present invention.

Referring specifically to FIG. 2, the IF SIGNAL from filter 35 is applied to an AM demodulator 41 where any amplitude modulation is extracted. The demodulated signal is passed through a low pass filter 42 which has a cut-off frequency on the order of 3 KHz to eliminate any undesirable high frequency components which may be present in the signal. The filtered amplitude modulation is then applied to each of activity factor circuit 43, AM variation circuit 44 and AM zero crossing circuit 45.

The activity factor circuit 43 includes a lowpass filter 46 having a cut-off frequency on the order of 7 to 10 Hz. This signal is then applied to a comparator amplifier 47 where it is compared to a preselected threshold level and then passed to reset integrator 48. The function of activity factor circuit 43 is to define the percentage of time that the envelope of the input signal is above a threshold as selected at comparator 47. To this end, signal above that level is passed by the comparator and integrated to provide a signal level proportional to the aforesaid percentage of time that the envelope level exceeds the threshold. This signal is then passed to the voltage comparator and latching registers circuit 50 which contains a plurality of voltage comparators, each feeding a latching circuit which is latched at its then current binary state by timing control circuitry described below. Such circuitry is well known in the art. The signal from integrator 48 is applied to two such comparators, each of which compares the applied signal to a different threshold level. One such comparator provides a binary one signal when the signal from integrator 48 reaches a first level, for example, 27% of the maximum possible output level from integrator 48. The second comparator provides a binary one signal when the signal from integrator 48 reaches a higher level, for example, 70% of the maximum integrator output level. These binary comparator signals are latched at the appropriate control times to provide the ACTIVITY FACTOR 1 and ACTIVITY FACTOR 2 signals.

The AM variation circuit 44 includes a squaring circuit 51 which receives the AM demodulation from filter 42 and provides an output level which is the square of the level it receives. After amplification at amplifier 52 the squared signal is integrated by reset integrator 53 before being passed on to a comparator in circuit 50. The AM variation circuit thus provides a signal level which is in effect the mean square of the detected amplitude modulation.

The AM zero crossing circuit 45 includes a comparator 54 which provides an output pulse each time the detected amplitude modulation signal from filter 42 crosses zero level. The frequency of the pulses thusly generated is converted to a voltage level, by frequency to voltage converter 55, and then integrated at integrator 56 before being passed to a comparator in circuit 56.

The IF SIGNAL from filter 35 (FIG. 1) is also applied to FM demodulator 61. The detected frequency modulation is then passed in parallel to each of the wideband and narrowband FM variation circuits 62 and 63, respectively. These two circuits are identical except for their passbands. The wideband circuit includes, in series, a high pass filter 64, having a flow frequency cut-off on the order of 550 Hz, amplifier 65, squaring circuit 66, threshold adjustment amplifier 67, and reset integrator 68. Narrowband circuit 63 includes lowpass filter 69 (having a high frequency cut off on the order of 200 Hz), amplifier 70, squaring circuit 71, threshold adjustment amplifier 72 and reset integrator 73. By distinguishing between wide and narrow band FM on the classified signal, the circuitry provides a means for distinguishing between single or quaternary frequency shift keying signals (narrowband) and multi-channel frequency shift keying signals (wideband). The output signals from integrators 68 and 73 are applied to respective comparators in circuit 50.

Figure 3:
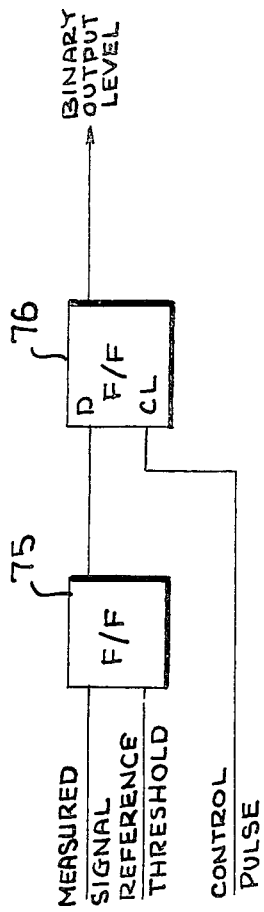
FIG. 3 is a schematic diagram of a typical voltage comparator and latch circuit employed in the circuit of FIG. 2.

A simplified version of one of the plural voltage comparators and latch circuits of the type used in circuit 50 is illustrated in FIG. 3. The measured signal, for example from any of reset integrators 48, 53, 56, 68 or 73, is applied to one terminal of a comparator flip flop 75. A second input signal to that flip flop is the reference level empoyed for the parameter being measured. Flip flop 75 is of the type which provides either of two binary output levels depending upon which of the two input signals is at a higher amplitude. In this case it is assumed that a binary one output level is present when the measured signal amplitude is higher and that a binary zero output level is provided when the threshold level is higher. The binary output signal from the flip flop 75 is applied to the data input terminal of a clocked flip flop 76. Flip flop 76 provides a binary output corresponding to the binary level appearing at its data terminal whenever a control or timing pulse is applied to its clock terminal. The output level, once assumed, cannot change until the next clock pulse is applied.

The output levels from the latch circuits of circuit 50 are designated in FIG. 2 as: ACTIVITY FACTOR 1, ACTIVITY FACTOR 2, AM VARIATION, AM ZERO CROSSING, WIDEBAND FM VARIATION, and NARROWBAND FM VARIATION. These signals are binary signals and are assumed for present purposes to be binary one when the measured parameter in question exceeds its preselected threshold, and binary zero when the parameter is below the threshold. These binary measurement signals are then applied to a programmable decoder 80 which is programmed to perform the classification logic on the basis of the states of the binary measurement signals.

Figure 4:
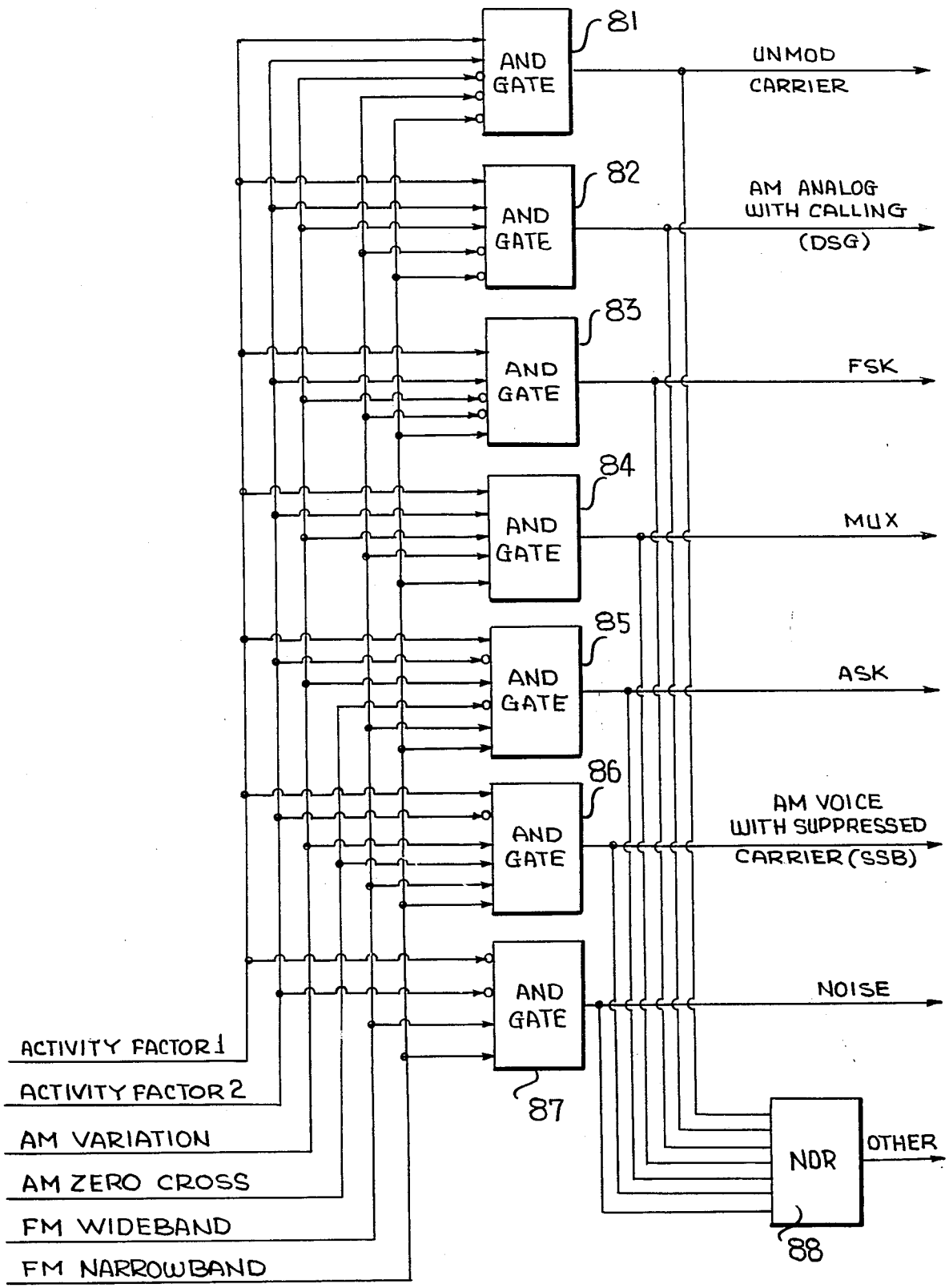
FIG. 4 is a schematic diagram of decoder logic circuitry employed in the signal classifier of FIG. 2.

A simplified version of circuit 80 is illustrated in FIG. 4. The circuit includes seven AND gates 81–87 and NOR gate 88. Different combinations of the binary measurement signals are applied to the various AND gates which decode the logic inherent therein to provide respective classification output signals. Thus, AND gate 81 provides an UNMOD CARRIER output signal whenever ACTIVITY FACTOR 1 and ACTIVITY FACTOR 2 are in the binary one state and AM VARIATION, FM WIDEBAND and FM NARROWBAND are in the binary zero state. In other words, when there is definitely a received signal (high ACTIVITY FACTOR) but no AM or FM, then the decision is made that an unmodulated carrier has been received.

AND gate 82 provides the output signal AM ANALOG WITH CARRIER (DSB) whenever both ACTIVITY FACTOR signals and the AM VARIATION signal are at the binary one level and the two FM signals are at binary zero. This stands to reason since it is clear from the ACTIVITY FACTOR signals that a carrier is present, and it is likewise clear from the AM and FM signals that only AM is present.

The FSK classification signal is provided by AND gate 83 whenever the two ACTIVITY FACTOR signals and the FM NARROWBAND signal are at binary one and the AM VARIATION signal and the FM WIDEBAND signal are at binary zero. In other words, a carrier is present, as determined by the ACTIVITY FACTOR signals, it contains negligible amplitude modulation as determined by the AM VARIATION signal, and it is a narrowband FM signal as determined by the FM signals. Under such conditions the narrowband FSK type signal is presumed to be present.

AND gate 84 provides the MUX signal whenever all of the ACTIVITY FACTOR 1, ACTIVITY FACTOR 2, AM VARIATION, FM WIDEBAND and FM NARROWBAND signals are at binary one. These are all characteristics of the wideband multichannel frequency shift keying signals.

The ASK classification signal is provided by gate 85 whenever ACTIVITY FACTOR 1, AM VARIATION, and both FM signals are binary one and ACTIVITY FACTOR 2 and AM ZERO CROSSING are binary zero. In other words, in ASK where a single oscillator is switched on and off, there is a signal present part of the time (ACTIVITY FACTOR 1 but not ACTIVITY FACTOR 2), there is detected AM and wideband FM and there are no zero crossings.

AND gate 86 provides the AM VOICE WITH SUPPRESSED CARRIER (SSB) signal under the identical conditions for the ASK signal at gate 85 except that the AM ZERO CROSSING signal is at binary one rather than binary zero. In other words, the suppressed carrier single sideband voice signal is distinguished from the ASK signal by virtue of zero crossings present in the detected amplitude modulation.

AND gate 87 determines that noise is being received whenever both ACTIVITY FACTOR signals are binary zero and both FM signals are binary one.

NOR gate 88 provides an OTHER signal, signifying that something other than the seven selected classes of signal is being received, whenever none of seven classification signals are provided.

Referring again to FIG. 2, each of the eight output signals from the circuit of FIG. 4 is connected to energize a corresponding lamp on the front panel of the system. In addition, these classification signals are applied to an encoder 90 which provides a binary word identifying the classification selected by the system.

Timing and control circuits 91 provide the timing and control functions for the system. Typically, the reset integrators 48, 53, 56, 68 and 73 are reset and permitted to integrate for anywhere from 0.5 to 2.0 seconds, as controlled by the operator. At the end of each integration cycle circuit 91 clocks latch 76 in circuit 50 to enter the data. The details of such timing functions and the particular timing selected are incidental to the signal classification process and are conventional in the art.

While we have described and illustrated one specific embodiment of our invention, it will be clear that variations of the details of construction which are specifically illustrated and described may be resorted to without departing from the true spirit and scope of the invention as defined in the appended claims. 9n

We claim:

1. A system for classifying high frequency communications signals according to the nature of modulation appearing on the signals, said system being arranged to process an intermediate frequency (IF) signal which has been translated in frequency at a receiver, said system comprising:

means for controlling the level of said IF signal to maintain it within a predetermined range of levels;

means for controlling the frequency of said IF signal to maintain it within a predetermined frequency range;

amplitude demodulator means for detecting the envelope of the level and frequency controlled IF signal;

activity factor circuit means for providing a first indication of the percentage of time that the detected envelope is at a level above a predetermined threshold level;

AM variation circuit means responsive to said detected envelope for providing a second indication of amplitude variations in said IF signal;

AM zero crossing circuit means for providing a third indication of the frequency at which zero level crossings occur in said detected envelope;

FM demodulator means for detecting frequency modulation appearing on said IF signal;

FM variation circuit means for providing further indications when the detected frequency modulation subsists in a first relatively low frequency band and a second relatively high frequency band; and logic means responsive to the indications provided by said activity factor, AM variation, AM zero crossing and FM variation circuit means for determining the nature of modulation appearing on said IF signal.

2. The system according to claim 1 wherein said logic means determines that an unmodulated carrier was received whenever the activity factor circuit means indicate that the detected envelope is present most of the time, the AM variation circuit means indicates that the detected envelope variation is at a very low level, and the FM variation circuit means indicates that there is negligible detected frequency modulation.

3. The system according to claim 1 wherein said logic means determines that an analog double sideband amplitude modulation signal is present whenever: said first indication is that detected envelope is present most of the time; said second indication is that the detected envelope variation is at a high level; and said further indications are that there is negligible detected frequency modulation.

4. The system according to claim 1 wherein said logic means determines that a frequency shift keying signal has been received whenever: said first indication is that detected envelope is present most of the time; said second indication is that detected envelope variation is at a low level; and said further indications are that the detected frequency modulation is present only in said first frequency band.

5. The system according to claim 1 wherein said logic means determines that a wideband multi-channel frequency shift keying signal has been received whenever: said first indication is that the detected envelope is present most of the time; said second indication is that said detected envelope variation is at a high level; and said further indications are that said detected frequency modulation is present in both said first and second frequency bands.

6. The system according to claim 1 wherein said logic means determines that a single sideband suppressed carrier AM voice signal is received whenever: said first indication is that said detected envelope is present only part of the time; said second indication is that the detected envelope variation is at a high level; said third indication is that there is a significant zero level crossing rate in the detected envelope; and said further indications are that the detected frequency modulation is present in both said first and second frequency bands.

7. The system according to claim 1 wherein said logic means determines that an amplitude shift keying signal is received whenever: said first indication is that said detected envelope is present for part of the time; said second indication is that said detected envelope variation is at a relatively high level; said third indication is that the zero level crossings in said detected envelope are negligible; and said further indications are that said detected frequency modulation is present in both said first and second frequency bands.

8. The system according to claim 1 wherein said logic means determines that noise is being received whenever: said first indication is that there is negligible detected envelope; and said further indications are that said detected frequency modulation is present in both said first and second frequency bands.

9. The system according to claim 1 further comprising means for adapting said system to different frequency IF signals received from said receiver.

10. A signal classifier for determining the type of modulation appearing on a measurement signal, said system comprising:

means for detecting the envelope of said measurement signal;

further means for distinguishing between amplitude shift keying modulation and suppressed carrier single sideband voice amplitude modulation, said further means comprising:

means for measuring the frequency of zero level crossings in said detected amplitude modulation;

logic means for determining that said type of modulation is amplitude shift keying when the frequency of said zero level crossings is very low and for determining that said type of modulation is suppressed carrier single sideband voice amplitude modulation when said zero level crossing frequency is relatively high.

11. A signal classifier system for determining the nature of modulation appearing on a measurement signal, said system comprising:

activity factor circuit means for providing a first indication of the percentage of time that the detected envelope is at a level above a predetermined threshold level;

AM variation circuit means responsive to said detected amplitude modulations for providing a second indication of amplitude variations in said measurement signal;

AM zero crossing circuit means for providing a third indication of the frequency at which zero level crossings occur in said detected amplitude modulation.

FM demodulator means for detecting frequency modulation appearing on said measurement signal;

FM variation circuit means for providing further indications when the detected frequency modulation subsists in a first relatively low frequency band and a second relatively high frequency band; and logic means responsive to the indications provided by said activity factor, AM variation, AM zero crossing and FM variation circuit means for determining the nature of modulation appearing on said measurement signal.

12. The system according to claim 11 wherein said logic means determines that an unmodulated carrier was received whenever the activity factor circuit means indicates that the detected signal amplitude is present most of the time, the AM variation circuit means indicates that the detected amplitude modulation is at a very low level, and the FM variation circuit means indicates that there is negligible detected frequency modulation.

13. The system according to claim 11 wherein said logic means determines that an analog double sideband amplitude modulation signal is present whenever: said first indication is that detected signal amplitude is present most of the time; said second indication is that the detected amplitude variation is at a high level; and said further indications are that there is negligible detected frequency modulation.

14. The system according to claim 11 wherein said logic means determines that a frequency shift keying signal has been received whenever: said first indication is that detected signal amplitude is present most of the time; said second indication is that the detected amplitude variation is at a low level; and said further indications are that the detected frequency modulation is present only in said first frequency band.

15. The system according to claim 11 wherein said logic means determines that a wideband multi-channel frequency shift keying signal has been received whenever: said first indication is that the detected signal amplitude is present most of the time; said second indication is that said detected amplitude variation is at a high level; and said further indications are that said detected frequency modulation is present in both said first and second frequency bands.

16. The system according to claim 11 wherein said logic means determines that a single sideband suppressed carrier AM voice signal is received whenever: said first indication is that said detected signal amplitude is present only part of the time; said second indication is that the detected amplitude variation is at a high level; said third indication is that there is a significant zero level crossing rate in the detected amplitude modulation; and said further indications are that the detected frequency modulation is present in both said first and second frequency bands.

17. The system according to claim 11 wherein said logic means determines that an amplitude shift keying signal is received whenever: said first indication is that said detected signal amplitude is present for part of the time; said second indication is that said detected amplitude variation is at a relatively high level; said third indication is that the zero level crossings in said detected amplitude modulation are negligible; and said further indications are that said detected frequency modulation is present in both said first and second frequency bands.

18. The system according to claim 11 wherein said logic means determines that noise is being received whenever: said first indication is that there is negligible detected signal amplitude; and said further indications are that said detected frequency modulation is present in both said first and second frequency bands.

19. A method for classifying high frequency communications signals according to the nature of modulation appearing on the signals, said method being arranged to process an intermediate frequency (IF) signal which has been translated in frequency at a receiver, said method comprising the steps of:

controlling the level of said IF signal to maintain it within a predetermined range of levels;

controlling the frequency of said IF signal to maintain it within a predetermined frequency range;

detecting signal amplitude modulation appearing on the level and frequency controlled IF signal;

providing a first indication of the percentage of time that the detected signal amplitude is at a level above a predetermined threshold level;

in response to said detected amplitude modulations, providing a second indication of amplitude variations in said IF signal;

providing a third indication of the frequency at which zero level crossings occur in said detected amplitude modulation;

detecting frequency modulation appearing on said IF signal;

providing further indications when the detected frequency modulation subsists in a first relatively low frequency band and a second relatively high frequency band; and in response to said indications, determining the nature of modulation appearing on said IF signal.

20. The method according to claim 19 wherein the last step determines that an unmodulated carrier was received whenever said first indication is that the detected signal amplitude is present most of the time, the second indication is that the detected amplitude modulation is at a very low level, and said further indications are that there is negligible detected frequency modulation.

21. The method according to claim 19 wherein the last step determines that an analog double sideband amplitude modulation signal is present whenever: said first indication is that detected signal amplitude is present most of the time; said second indication is that the detected amplitude modulation is at a high level; and said further indications are that there is negligible detected frequency modulation.

22. The method according to claim 19 wherein the last step determines that a frequency shift keying signal has been received whenever: said first indication is that detected signal amplitude is present most of the time; said second indication is that the detected amplitude modulation is of a low level; and said further indications are that the detected frequency modulation is present only in said first frequency band.

23. The method according to claim 19 wherein the last step determines that a wideband multi-channel frequency shift keying signal has been received whenever: said first indication is that the detected signal amplitude is present most of the time; said second indication is that said detected amplitude modulation is at a high level; and said further indications are that said detected frequency modulation is present in both said first and second frequency bands.

24. The method according to claim 19 wherein the last step determines that a single sideband suppressed carrier AM voice signal is received whenever: said first indication is that said detected signal amplitude is present only part of the time; said second indication is that the detected amplitude modulation is at a high level; said third indication is that there is a significant zero level crossing rate in the detected amplitude modulation; and said further indications are that the detected frequency modulation is present in both said first and second frequency bands.

25. The method according to claim 19 wherein the last step determines that an amplitude shift keying signal is received whenever: said first indication is that said detected signal amplitude is present for part of the time; said second indication is that said detected amplitude modulation is at a relatively high level; said third indication is that the zero level crossings in said detected amplitude modulation are negligible; and said further indications are that said detected frequency modulation is present in both said first and second frequency bands.

26. The method according to claim 19 wherein the last step determines that noise is being received whenever: said first indication is that there is negligible detected signal amplitude; and said further indications are that said detected frequency modulation is present in both said first and second frequency bands.

27. The method according to claim 19 further comprising the step of adapting said system to different frequency IF signals received from said receiver.

* * * * *